3,766,059
FILTERING METHOD AND A FILTERING
MACHINE THEREFOR
Jiro Sasaki, Nara, Japan, assignor to Toshin Science
Co., Ltd., Osaka, Japan
Filed Aug. 27, 1971, Ser. No. 175,494
Claims priority, application Japan, Dec. 28, 1970,
46/127,159; May 29, 1971, 46/44,645
Int. Cl. B01d 35/20
U.S. Cl. 210—19
4 Claims

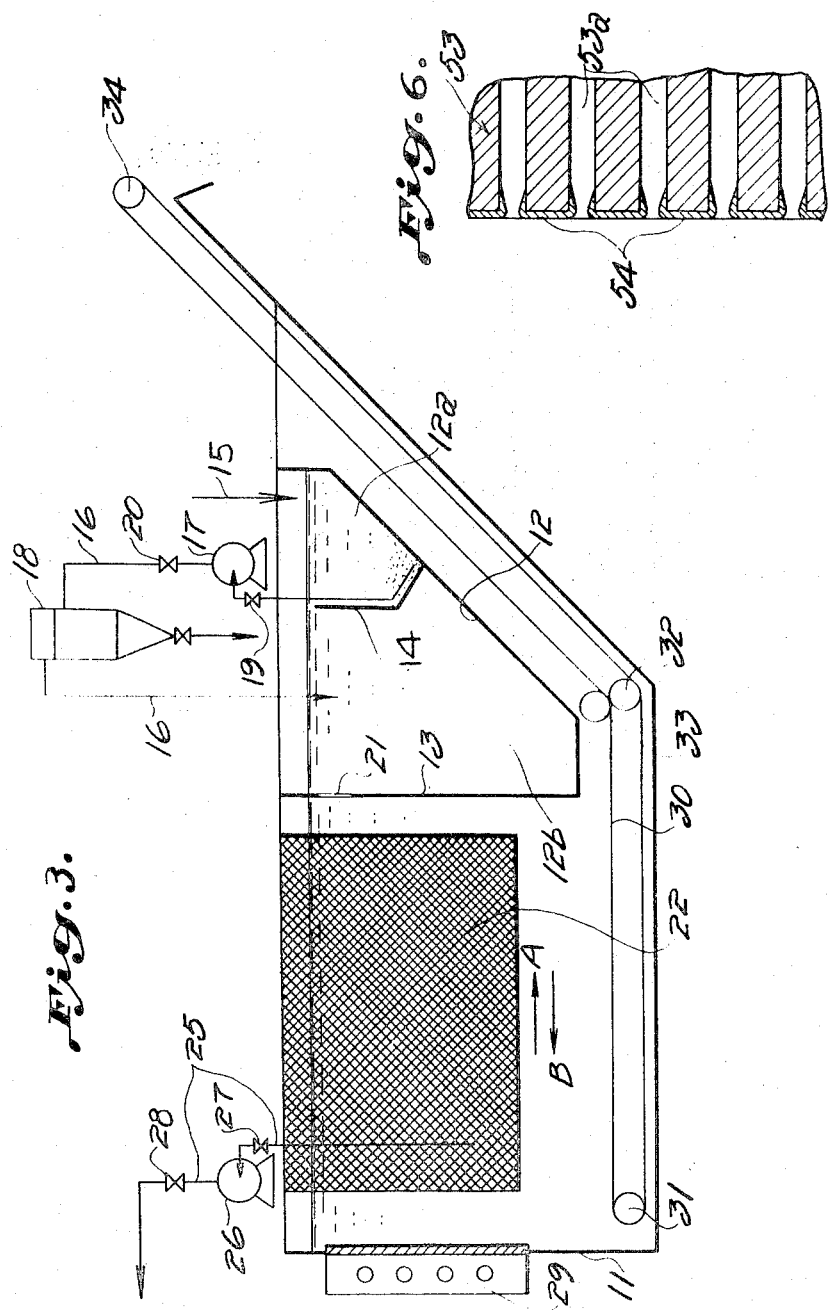

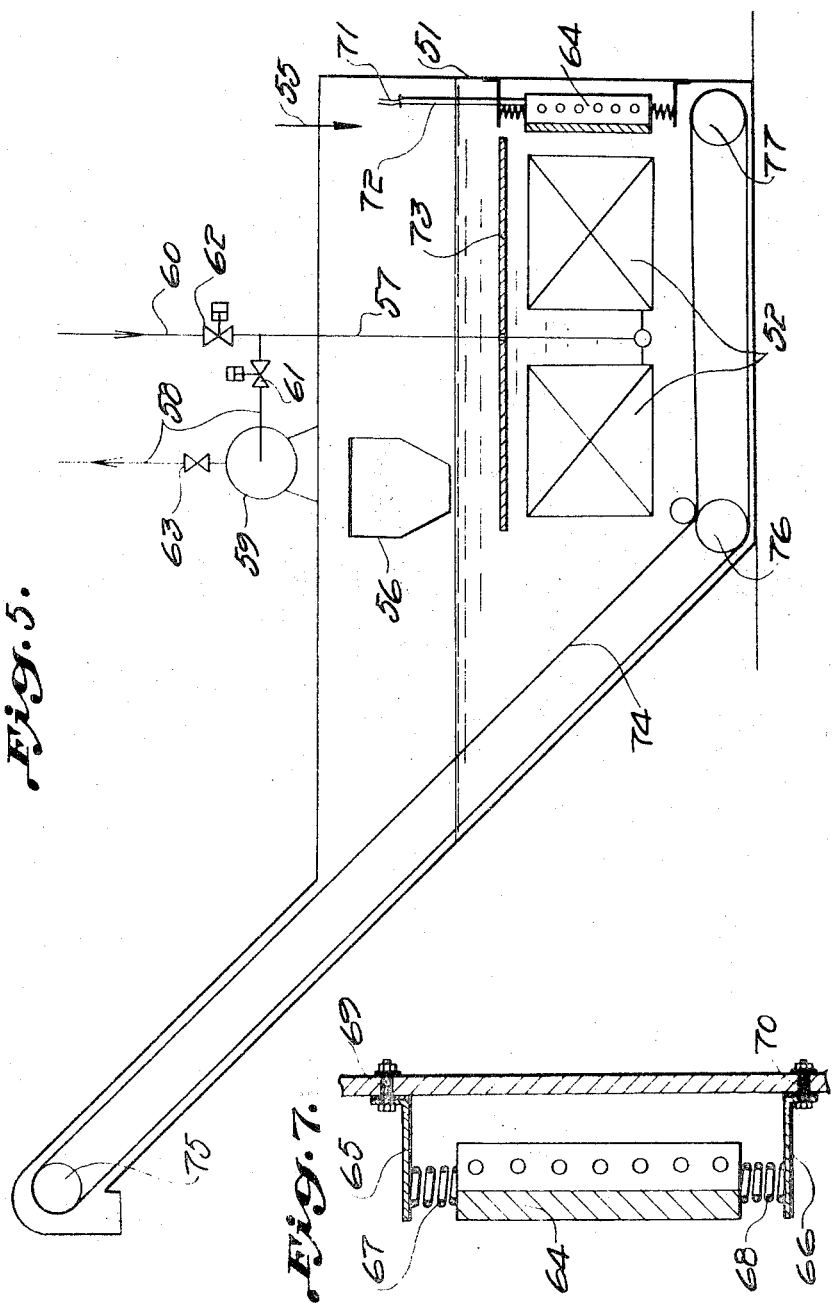

ABSTRACT OF THE DISCLOSURE

A filtering method wherein sonic or ultrasonic oscillation is given to liquid to be filtered and flowing into the direction normal to the surface of the filter medium in such a manner that said liquid is oscillated along a direction parallel to the surface of said medium, whereby the liquid together with impurity particles therein is caused to move with a predetermined angle smaller than 90 degree with respect to the surface of the filter medium so that impurity particles having diameters much smaller than the internal diameter of the pores penetrating the medium never enter said pores. Thus, impurity particles much smaller than said pores can be removed, resulting in no need of backwashing of the filter medium for a long period of time. The present invention is further concerned with a filtering machine for performing said method.

This invention relates to a novel filtering method, and more particularly to a filtering method which enables to remove impurity particles having diameters smaller than the internal diameter of pores penetrating the filter medium from liquid to be purified by filtration, whereby said pores of the filter medium are never choked for a long period of time of filtering operation. The present invention also relates to a filtering machine for performing said filtering method.

According to the conventional theory on filtration, the smaller the internal diameter of pores penetrating the filter medium is made, the finer impurity particles adhere to the surface of the filter medium and integrate on said surface so that the inlets of said pores of the medium are narrowed further, whereby filtrate having passed through said inlets has a higher purification degree. In practice, however, the inlets of pores penetrating the filter medium are choked by the film or layer of adhered and integrated impurity particles in a short period of time of filtering operation when such finer impurity particles adhere to the surface of the filter medium. In other words, a filtering machine which gives filtrate of higher purification degree is also a filtering machine which prevents continuous operation of filtration and requires more frequent backwashing for regenerating the filter medium. Therefore, precise filtration giving filtrate of a high purification degree is never compatible with efficient filtration giving a high rate of filtrate in the conventional filtering methods and machines.

Accordingly, the primary object of the present invention is to provide a novel filtering method which permits precise filtration with a high efficiency by avoiding the choking of pores penetrating the filter medium for a long period of time of filtering operation.

Another object of the present invention is to provide a filtering machine which makes possible to carry out the filtering method according to the present invention in a smooth manner and without any trouble.

The filtering method according to the present invention is characterized in that sonic or ultrasonic oscillation is given to liquid to be filtered and flowing into the direction normal to the surface of the filter medium in such a manner that said liquid is oscillated along a direction parallel to the surface of said medium with a predetermined velocity of oscillation and with an amplitude which is larger than the internal diameter of pores penetrating the medium, whereby said liquid together with impurity particles therein is caused to move toward the medium with a predetermined angle with respect to said surface of the medium so that impurity particles having particle sizes larger than a predetermined value never enter the pores penetrating the filter medium.

When liquid to be filtered is thus moved toward the filter medium with a predetermined angle smaller than 90 degrees with respect to the surface of said filter medium, impurity particles having particle sizes larger than predetermined value which is much smaller than the internal diameter of the pores penetrating the filter medium never enter said pores of the medium, as will be clarified after with reference to FIGS. 1 and 2. Thus, filter medium having pores which are much larger than particles sizes intended to remove can be employed, whereby adhesion and integration of impurity particles on the medium are much decreased so that choking of the filter medium is never caused for a long period of time.

The filtering machine according to the present invention comprises a filtering tank, at least one filter which is equipped in said tank and divides the interior of the tank into a slurry chamber and a filtrate chamber, means for feeding liquid to be filtered into said slurry chamber, means for pumping filtrate out of said filtrate chamber, and an oscillator which gives sonic or ultrasonic oscillation to said liquid to be filtered. Said filter in the filtering tank is provided with filter medium only at faces parallel to the oscillating direction of sonic or ultrasonic wave generated by said oscillator and the other faces of the filter are formed into liquid-tight walls.

The oscillator may be fixedly provided to a side wall of the filtering tank or may be supported by a side wall of said filtering tank through an oscillation-absorbing device. In the latter case, transmission of mechanical oscillation to the filtering tank and accessories thereof is preferably prevented. In a particular case, the oscillator may be provided on the way of said means for feeding liquid to be filtered for simplifying the construction of the machine For avoiding the loss of oscillation energy into the air, the machine may be provided with a plate member which prevents the oscillation from diffusing toward the boundary surface between the liquid and the air. Further, for avoiding the decrease of velocity of the oscillation near the surface of the filter medium due to the resistance against oscillation given by said surface of the medium which surface confronts the liquid to be filtered, liquid-repulsing film of a substance having small wetting-ability or small affinity with the liquid to be filtered may be formed on said surface of the medium.

The present invention will become more readily apparent as the specification is considered in conjunction with the accompanying drawings in which:

FIG. 3 is a diagrammatic sectional view of an embodiment of the filtering machine according to the present invention;

FIG. 5 is a diagrammatic sectional view of another embodiment of the filtering machine according to the present invention;

FIG. 6 is an enlarged sectional view of a part of the filter employed in the filtering machine shown in FIG. 5;

FIG. 7 is an enlarged sectional view of the oscillator employed in the filtering machine shown in FIG. 5;

Figure 1:
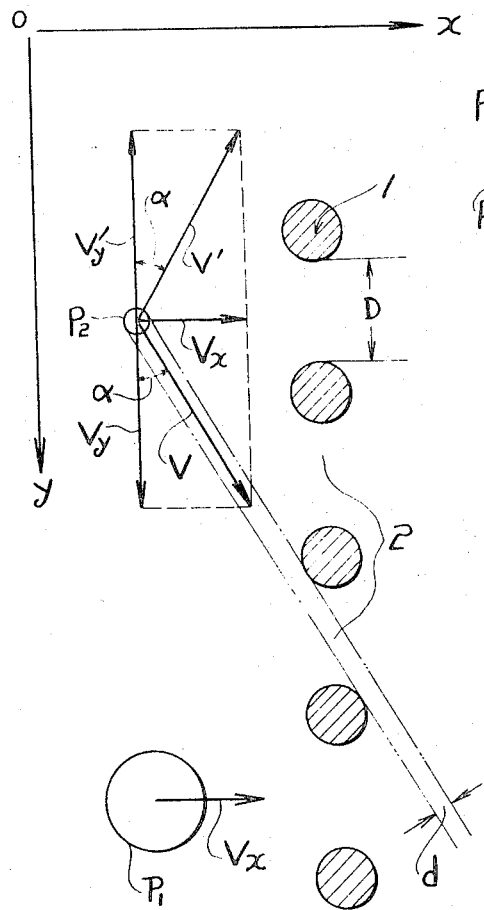
FIG. 1 is a diagrammatic view illustrating the principle of the filtering method according to the present invention.

Referring now to the drawings, there is shown in FIG. 1 the principle of the filtering method according to the present invention. It is supposed that each pore 2 penetrating the filter medium 1 has a circular cross-section with an internal diameter of D and each impurity particle in the liquid to be filtered or purified is in the form of a sphere. The x-coordinate is taken along the direction normal to the surface of the filter medium 1 and the y-coordinate is taken along the direction parallel to the surface of the filter medium, as shown in FIG. 1. Each impurity particles $P_1$ or $P_2$ has a velocity vector $Vx$ determined by the extraction rate of purified liquid or filtrate from the filtrate chamber at the opposite side of the filter medium 1. When the liquid together with impurity particles therein is flowed into the direction normal to the surface of the filter medium 1, namely along the x-coordinate, impurity particles having diameter smaller than the pores 2 penetrating the filter medium 1 will enter said pores 2 and passes the same into the filtrate chamber, as in the case of particles $P_1$ shown in the lower side of FIG. 1. In contract to the above, when sonic or ultrasonic oscillation having velocity vector $Vy$ and $Vy'$ of oscillation and having amplitude larger than the internal diameter D of each pore 2 is given along the direction parallel to the surface of the filter medium 1, namely along the y-coordinate, to each impurity particle which is flowing into the direction normal to the surface of the medium 1 with a velocity represented by velocity vector $Vx$, said impurity particle is moved toward the medium 1 with an angle $\alpha$ with respect to the surface of the filter medium 1 with a composite velocity vector $V$ or $V'$ of the vectors $Vx$ and $Vy$ or $Vy'$, as is the case of particle $P_2$ shown in the upper side of FIG. 1. In the latter case, impurity particles having particle sizes larger than diameter $d$ never enter the pores 2 whereby such larger particles are removed so as not to mix into filtrate, as clearly understood from FIG. 1. As can be understood now, the smaller is the ratio between $Vx$ and $Vy$ or $Vy'$, the smaller becomes the angle $\alpha$ whereby still smaller impurity particles are removed. Thus, impurity particles having diameters much smaller than the internal diameter D of the pores 2 can be removed or filtered out.

Figure 2:
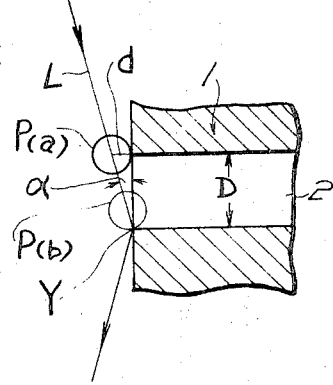
FIG. 2 is another diagrammatic view illustrating the principle of the filtering method according to the present invention.

In FIG. 2 wherein like numerals designate like parts, there is shown a diagrammatic view for obtaining the relation between the angle $\alpha$ and the diameter of the smallest impurity particle which can be removed. In the case where such smallest impurity particle having diameter $d$ does not enter the pore 2 penetrating the filter medium 1, said particle is moved toward the lowest inlet portion Y of the pore 2 and impurity particles larger than such smallest particle rebound at the surface of the filter medium so that they never enter the pores 2. In case where said smallest particle passes the highest inlet portion, namely said particle is in the position $P(a)$ shown in FIG. 2, the circumference of the particle is in contact with the surface of the pore 2 as shown in FIG. 2. Further, the moving path of the center of said particle is represented by line L the lower end of which reaches the lowest inlet portion Y of the pore 2 when the particle is in the position $P(b)$ shown in FIG. 2. Therefore, the angle $\alpha$ is $$\tan^{-1}\frac{d}{2D}$$

and said smallest particle never enters the pore 2 so far as it is moved toward the surface of the medium 1 with an angle smaller than said angle. So, the condition that an impurity particle having diameter $d$ will never enter the pore 2 having internal diameter D is given by the following Formula 1;

$$\tan^{-1}\frac{d}{2D} > \alpha \qquad (1)$$

As understood from FIG. 1, such angle $\alpha$ is given by the following Formula 2;

$$\alpha = \tan^{-1}\frac{Vx}{Vy} = \tan^{-1}\frac{Vx'}{Vy'} \qquad (2)$$

From the Formulas 1 and 2, the condition that impurity particles having diameters $d$ or more than $d$ will never enter the pores having internal diameter D penetrating the filter medium 1 is given by the following Formula 3;

$$\frac{d}{2D} > \frac{Vx}{Vy} = \frac{Vx}{Vy'} \qquad (3)$$

The filtration according to the present invention is performed under the condition given by the Formula 3. That is, liquid to be filtered is caused to move together with impurity particles therein by predetermining the flow rate $Vx$ and oscillation rate $Vy$ and $Vy'$ according to the Formula 3. Of course, there are impurity particles with various sizes in the liquid to be filtered and not all the pores penetrating the filter medium have the same internal diameter. But, when the internal diameter of the largest pore in the filter medium and the diameter of the smallest impurity particle intended to remove are used in predetermining the ratio between the flow rate $Vx$ and the oscillation rate $Vy$ and $Vy'$, the intended degree of purification is always achieved.

Figure 4:
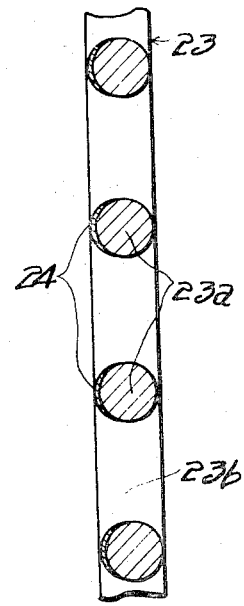
FIG. 4 is an enlarged sectional view of a part of the filter employed in the filtering machine shown in FIG. 3.

Referring to FIGS. 3 and 4, there is shown a preferred embodiment of the filtering machine according to the present invention. The machine includes a filtering tank 11 and slurry-receiving tank 12 which is separated from the filtering tank 11 by a separating wall 13. The slurry-receiving tank 12 is divided by a dividing wall 14 into a primary tank 12a and a secondary tank 12b. Liquid to be filtered, namely slurry, is fed into the primary tank 12a through a slurry-feeding pipe 15. Liquid in the primary tank 12a is introduced into the secondary tank 12b by the overflow of said liquid over the dividing wall 14 between the tanks 12a and 12b and also through a pipe line 16. Said pipe line 16 is opened to a portion near the bottom of the primary tank 12a at one end and to an upper portion of the secondary tank 12b at the other end and includes a pump 17 for pumping liquid out of the primary tank 12a and a cyclone 18 for removing or separating larger impurity particles from the liquid flowing through the pipe line 16. Thus, the top of the liquid in the primary tank 12a is introduced directly into the secondary tank 12b and cloudy liquid near the bottom of the primary tank 12a is introduced into the secondary tank after the liquid has roughly been cleaned by the cyclone 18. The pipe line 16 also includes control valves 19 and 20 at the inlet and outlet sides of the pump 17. The liquid having thus introduced into the secondary tank 12b is fed into the filtering tank through an opening 21 provided to the dividing wall 13 between the filtering tank 11 and the secondary tank 12b by overflowing.

In the filtering tank 11, there is equipped a filter 22 in the form of a rectangular box which filter divides the interior of the tank 11 into a slurry chamber outside the filter 22 and a filtrate chamber inside the filter 22. Said filter 22 is provdied with filter medium at front and back faces perpendicular to the dividing wall 13 and bottom face. The other faces of the filter 22 are formed into liquid-tight walls. As shown in FIG. 4, said filter medium 23 is formed with gauze of stainless steel or the like having a number of horizontal wires 23a and vertical wires 23b so as to form a number of pores penetrating the medium 23. On the surface of the filter medium 23 which surface confronts the slurry in the slurry chamber of the filtering tank 11, there is formed liquid-repulsing film 24 of a substance having small wetting-ability or small affinity with the liquid to be filtered such as fluorine-contained polymer or silicone resin. Such film may be formed by coating a resin on said surface of the medium 23 by means of a spray-gun and drying the coated film or layer.

A pipe line 25 for pumping-out filtrate is opened in the filtrate chamber inside the filter 22 at one end thereof. The pipe-line 25 includes a filtrate-extracting pump 26 and control valves 27 and 28.

To a side wall of the filtering tank 11 is fixedly provided an oscillator 29 which generates sonic or ultrasonic wave so as to give the liquid in the slurry chamber of the filtering tank 11 sonic or ultrasonic oscillation along arrows A and B shown in FIG. 3.

Further, there is provided an endless conveyor 30 which is trained over wheels 31, 32, 33 and 34 and is driven to run by driving any of said wheels. The conveyor 30 passes near the bottom of the slurry chamber in the filtering tank 11 and conveys sludge which falls down or precipitates during the filtering operation so as to discharge said cakes at the top wheel 34 out of the filtering machine.

In the filtering operation, the oscillator 29 gives sonic or ultrasonic oscillation along arrows A and B to the liquid to be filtered or slurry in the slurry chamber of the filtering tank 11. At the same time, said liquid or slurry is flowing into the direction normal to the surface of the filter medium 23 provided to the filter 22 at a rate determined by the extraction rate of filtrate out of the filtrate chamber by means of the filtrate-extracting pump 26. So, the liquid or slurry is caused to move toward the filter medium 23 with an angle smaller than 90 degrees with respect to the surface of said medium. In such a case, impurity particles having particle sizes larger than the pores penetrating the medium 23 never enter said pores whereby such larger particles are removed. Accordingly, in case when the ratio between the velocity of oscillation given to the liquid by the oscillator 29 and the flow rate of the liquid normal to the surface of the filter medium 23 which rate is determined by the extraction rate of filtrate by means of the pump 26 is predetermined at a certain value, impurity particles having particle sizes larger than a predetermined one never enter the pores of the filter medium 23, as detailed previously with reference to FIGS. 1 and 2, whereby intended degrees of purification is achieved. Owing to the fact that impurity particles much larger than the internal diameter of the pores penetrating the filter medium are removed, filter medium having much larger pores can be employed so that said pores of the medium are never choked for a long period of time of filtering operation.

Further, when impurity particles becomes adhered to the surface of the filter medium 24, said particles are likely to leave the surface due to the force given to said particles by the oscillating liquid, that prevents the filter medium from choking, too. That is, the oscillation also plays a role cleaning the surface of the filter medium during a filtering operation.

In FIGS. 5 through 7, there is shown an another embodiment of the filtering machine according to the present invention. In this improved embodiment, there are equipped in a filtering tank 51 two filters 52 which divide the interior of the tank 51 into a slurry chamber outside the filters and filtrate chamber inside the filters. Similar to the one shown in FIGS. 3 and 4 and detailed hereinbefore, said filters 52 are provided with filter medium only at front and back faces and bottom faces and the other faces are formed into liquid-tight walls. As shown in FIG. 6, the filter medium 53 is composed of glass fibers, synthetic fibers or the like, and liquid-repulsing film 54 of a substance having small wetting-ability or small affinity with the liquid to be filtered such as silicone resin is formed on the surface of the medium 53 which surface confronts liquid to be filtered, liquid to be filtered or slurry is fed into the slurry chamber of the tank 51 through a pipe 55 or a feeding trough 56, and filtrate is pumped out of the filtrate chamber in the filters 52 through pipe 57 and 58 by the operation of a pump 59. That is, the pipe 57 is opened to the filtrate chamber in the filters 52 at one end and is communicated to the pipe 58 to which the pump 59 is provided. To the pipe 57, there is connected a pipe which supplies compressed air for back-washing into the filtrate chamber in the filter 52 when a filtering operation has been completed. Said air passes through pores 53a of the filter medium 53 from the filtrate chamber toward the slurry chamber so as to remove cakes choking the pores 53a and adhered to the surface of the medium 53. When such a back-washing is made, a valve 61 provided to the pipe 58 before the pump 59 is closed and a valve 62 provided to the pipe 60 is opened. Further, a control valve 63 is provided to the pipe 58 after the pump 59.

In the filtering tank 51, there is equipped an oscillator 64 which gives sonic or ultrasonic oscillation to the liquid to be filtered in the slurry chamber. Said oscillation is parallel to the faces of the filters 52 to which faces the filter medium 53 is provided. As clearly shown in FIG. 7, the oscillator 64 is positioned at one side of the slurry chamber and is supported by upper and lower brackets 65 and 66 through upper and lower coil springs 67 and 68. The upper and lower brackets 65 and 66 are formed into L-letters ones and are fixed to a side-wall of the tank 51 by bolts 69 and 70 at the legs through packings of rubber. Said mechanism for supporting the oscillator 64 to the wall of the tank 51 acts as an oscillation-absorbing device, so that mechanical oscillation caused by the oscillator 64 is never transmitted to the filtering tank 51 whereby the tank and the accessories thereof are prevented from damages during a filtering operation. The oscillator 64 is provided with electric wires 71 for feeding electric power to the oscillator and said wires 71 are protected by a sealing tube 72 which is projected upwardly from the oscillator above the liquid level in the slurry chamber.

Further, there is provided above the filters 52 and below the liquid level in the slurry chamber a plate member 73 of stainless steel which prevents the oscillation from diffusing toward the boundary surface between the liquid and the air in the filtering tank 51. Thus, the loss of oscillation energy which tends to run away into the air by diffusion is well avoided.

Similarly to the filtering machine shown in FIGS. 3 and 4, there is provided an endless sludge-discharging conveyor 74 which is trained over pulleys 75, 76 and 77 and is driven by one of said pulleys so as to discharge sludge having falled down in the slurry chamber at the uppermost pulley 75.

The filtering operation by using the filtering machine shown in FIGS. 5 through 7 is carried out in the same manner as detailed before with reference to the machine shown in FIGS. 3 and 4. The filtering machine shown in FIGS. 5 through 7 is, however, more advantageous in operating filtration because mechanical oscillation is never transmitted to the filtering tank 51 and the loss of oscillation energy is well avoided.

Figure 8:
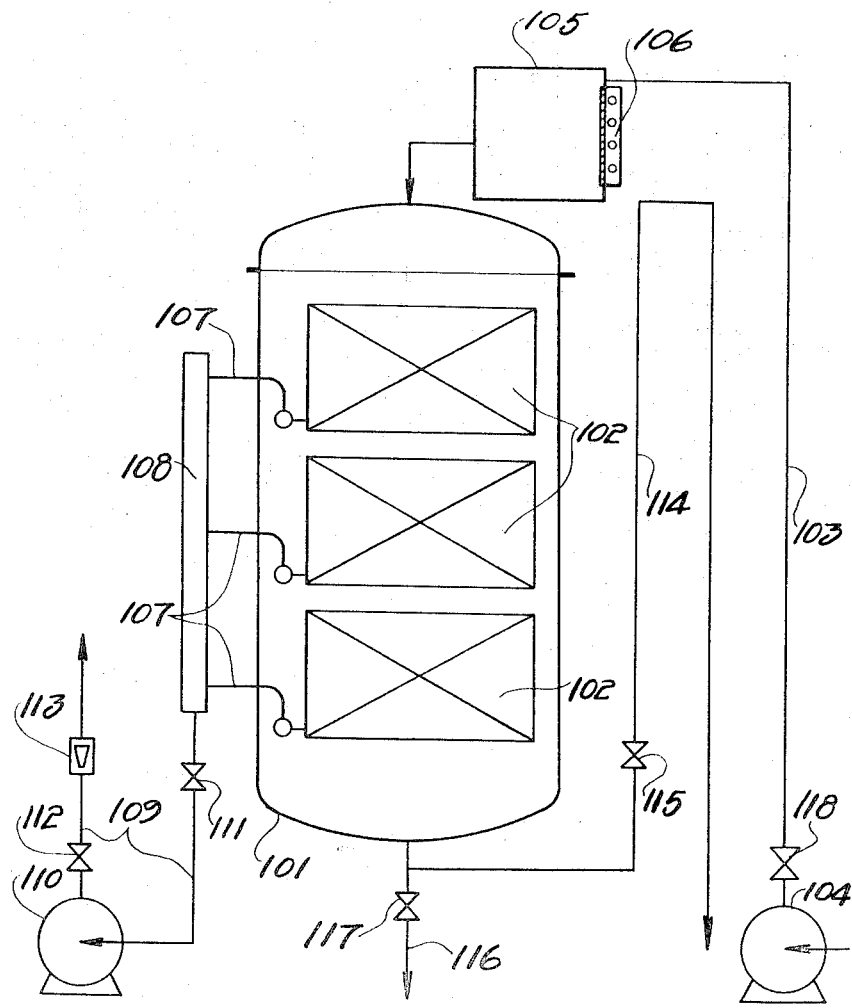
FIG. 8 is a diagrammatic sectional view of a still another embodiment of the filtering machine according to the present invention.

In FIG. 8, there is shown a still another embodiment of the filtering machine according to the present invention. In this embodiment, there are equipped in a filtering tank 101 three filters 102 which divide the interior of the tank 101 into a slurry chamber outside the filters and filtrate chambers inside the filters. Liquid to be filtered is fed through a pipe line 103 by a pump 104. Said pipe line 103 includes an oscillation-providing tank 105 in which an oscillator 106 is equipped. Said oscillator 106 gives oscillation to liquid flowing through the pipe line 103 so as to oscillate said liquid in the direction of flowing of the liquid. Thus, the liquid to be filtered is introduced in the slurry chamber with oscillating in the vertical direction and is filtered by the filters 102 which are provided with filter medium only at vertical faces and the upper and lower faces of which are formed into liquid-tight walls.

Filtrate is pumped out of the filtrate chambers in the filters 102 through pipes 107 which are opened to the filtrate chambers at one end, a filter-gathering tube 108 to which the other ends of the pipes 107 are communicated, and a pipe 109 which is communicated to the tube 108 and is provided with a pump 110. The pipe line 109 is provided with control valves 111 and 112 before and after the pump 110 and a flow-meter 113. The liquid to be filtered in the slurry chamber is overflowed through an overflow pipe 114 which is opened to said slurry chamber at one end and is provided with a control valve 115. Precipitation on the bottom of the tank 101 is intermittently discharged through a discharging pipe 116 by opening a valve 117 provided to said pipe 116. A control valve 118 is provided to the pipe line 103 after the pump 104.

In operating the filtering machine shown in FIG. 8, liquid in the slurry chamber of the filtering tank 101 is oscillated along the vertical direction with some deviation of said oscillating direction. Notwithstanding such deviation of oscillating direction, the filtering machine is satisfactorily employed for filtration of liquid which be cleaned roughly.

The most important advantage of the present invention consists in the fact that impurity particles having particle sizes much larger than the ones of pores penetrating the filter medium can be removed or separated from liquid to be filtered so that filters provided with filter medium having pretty large pores may be employed in the filtering machine, whereby filtering operation can be carried out continuously without choking of the filter medium for a long period of time. Thus, aforementioned trouble or incompatibility of high efficiency and high purification degree in the conventional filtering process is fully avoided. This advantage is enhanced by the particle-removing action of oscillating liquid to be filtered by which action impurity particles adhered to the surface of the filter medium are removed or separated into the slurry chamber.

Having now described the invention and having exemplified the manner in which it can be carried into practice, it is apparent to those skilled in the art that innumerable variations, applications, modifications and extensions of the basic principles involved may be made without departing from the spirit of the present invention. The invention is, therefore, to be limited only by the scope of the appended claims.

I claim:

1. A method of filtering a liquid comprising the steps of flowing the liquid toward a filter in a direction generally perpendicular to the surface of the filter while providing ultrasonic oscillation to the liquid so that the liquid is oscillated in a direction generally parallel to the surface of the filter with a predetermined velocity of oscillation, the amplitude of oscillation of the liquid being greater than the inner diameter of pores through the filter whereby the liquid and particles therein are caused to move toward the filter at a predetermined angle with respect to the surface of the filter so that particles having a size larger than a predetermined size do not enter the pores through the filter.

2. The method of claim 1 in which the predetermined velocity of the liquid in a direction parallel to the surface of the filter is greater than $$\frac{2DV_x}{d}$$

where D is the diameter of the pores through the filter, $d$ is the diameter of the smallest particle that is desired to be screened by the filter, and $V_x$ is the flow rate of the liquid through the filter.

3. A method of filtering a liquid carrying particles having a diameter $d$ through a filter having a filter medium provided with pores having a diameter D, the diameter of the pores being greater than the diameter of the particles, comprising the steps of positioning the filter in a filter tank, flowing the liquid toward the filter in a direction generally perpendicular to the surface of the filter medium while withdrawing filtered liquid from the tank and while providing sonic or ultrasonic oscillation to the liquid so that the liquid is oscillated in a direction generally parallel to the surface of the filter with a velocity of oscillation greater than $$\frac{2DV_x}{d}$$

where $V_x$ is the velocity of the liquid passing through the filter caused by withdrawing filtered liquid from the tank, the amplitude of oscillation of the liquid being greater than the inner diameter of the pores through the filter medium, whereby the liquid and particles therein are caused to move toward the filter at a sufficient angle with respect to the surface of the filter medium that particles having a diameter greater than $d$ cannot enter the pores through the filter medium.

4. A filtering apparatus comprising a filtering tank, a filter supported in the tank and dividing the interior of the tank into a slurry chamber and a filtrate chamber, means for feeding liquid to be filtered into said slurry chamber, means for pumping filtrate out of said filtrate chamber, and an oscillator which provides sonic or ultrasonic oscillation to the liquid to be filtered, said filter being provided with filter medium only at surfaces thereof which are parallel to the oscillating direction of the wave generated by the oscillator, the other surfaces of the filter being formed into liquid-tight walls.

References Cited

UNITED STATES PATENTS

| | | | |
|---|---|---|---|
| 3,053,031 | 9/1962 | Vedder et al. | 210—Dig. 18 |
| 2,896,922 | 7/1959 | Pohlman | 210—19 X |
| 2,183,896 | 12/1939 | Rupp et al. | 210—19 |
| 2,799,398 | 7/1957 | Heymann | 210—19 |
| 3,200,567 | 8/1965 | May | 210—19 X |
| 3,305,481 | 2/1967 | Peterson | 210—19 |

SAMIH N. ZAHARNA, Primary Examiner

F. F. CALVETTI, Assistant Examiner

U.S. Cl. X.R.

210—65, 332, 407, DIG 22